(12) United States Patent
Salmi et al.

(10) Patent No.: US 11,745,935 B2
(45) Date of Patent: Sep. 5, 2023

(54) WRAP FOR SMOKING ARTICLES WITH A REUSABLE CLOSING PORTION

(71) Applicant: G.D SOCIETA' PER AZIONI, Bologna (IT)

(72) Inventors: Stefano Salmi, Bologna (IT); Stefano Sarti, Bologna (IT); Roberto Polloni, Bologna (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 0 days.

(21) Appl. No.: 17/622,168

(22) PCT Filed: Jul. 1, 2020

(86) PCT No.: PCT/IB2020/056221
§ 371 (c)(1),
(2) Date: Dec. 22, 2021

(87) PCT Pub. No.: WO2021/001765
PCT Pub. Date: Jan. 7, 2021

(65) Prior Publication Data
US 2022/0356004 A1    Nov. 10, 2022

(30) Foreign Application Priority Data
Jul. 1, 2019   (IT) .................. 102019000010518

(51) Int. Cl.
*B65D 85/10* (2006.01)
(52) U.S. Cl.
CPC ..... *B65D 85/1027* (2013.01); *B65D 85/1045* (2013.01); *B65D 85/1081* (2013.01)
(58) Field of Classification Search
CPC ............ B65D 85/1027; B65D 85/1045; B65D 85/1081; B65D 85/10
(Continued)

(56) References Cited

U.S. PATENT DOCUMENTS 2,109,100 A * 2/1938 Brophy .............. B65D 85/1027
                                                            206/268
5,301,804 A * 4/1994 Focke ................ B65D 85/1027
                                                            206/264

FOREIGN PATENT DOCUMENTS

CN       105358450 A    2/2016
EP       2345600 A2     7/2011
(Continued)

OTHER PUBLICATIONS

International Search Report and Written Opinion for Corresponding International Application No. PCT/IB2020/056221 dated Nov. 2, 2020.

*Primary Examiner* — Bryon P Gehman
(74) *Attorney, Agent, or Firm* — MARSHALL, GERSTEIN & BORUN LLP

(57) ABSTRACT

A wrap for smoking articles, which encloses a group of smoking articles and has, at the top and at the front, a first extraction opening obtained through the wrap by means of a "U"-shaped through cut. The first extraction opening is normally closed by a reusable closing portion, which consists of the part of the wrap surrounded by the through cut and it can be lifted to free the first extraction opening and then lowered again to engage the first extraction opening. A support element is comprised, which is arranged inside the wrap at the first extraction opening, it is glued to the wrap at least by means of a re-stick glue, and it has a second extraction opening, which is smaller than the first extraction opening and it is entirely contained in the first extraction opening.

17 Claims, 14 Drawing Sheets

(58) Field of Classification Search
USPC .................................................. 206/264–268
See application file for complete search history.

(56) References Cited

FOREIGN PATENT DOCUMENTS

| WO | WO-2014207727 | 12/2014 |
| WO | WO-2016/001826 A1 | 1/2016 |
| WO | WO-2017/093831 A1 | 6/2017 |

* cited by examiner

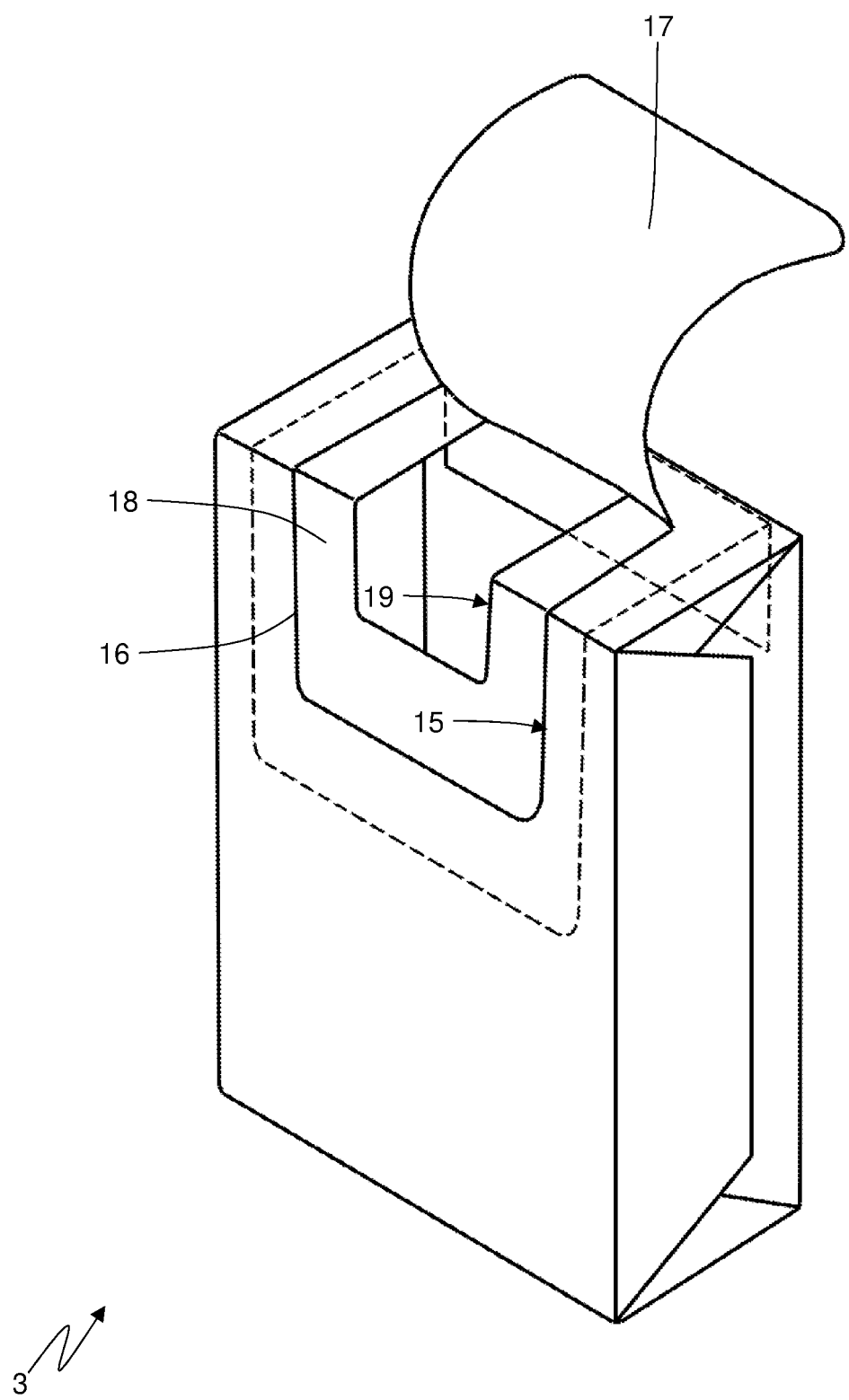

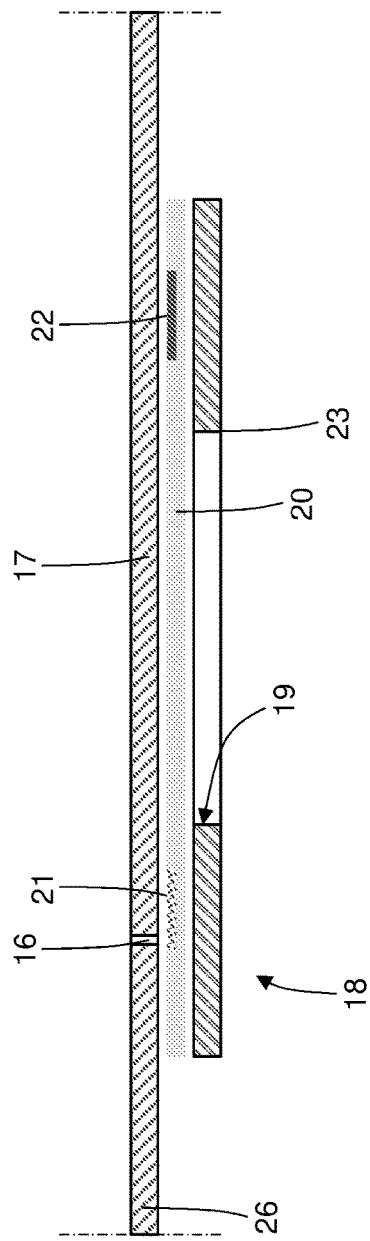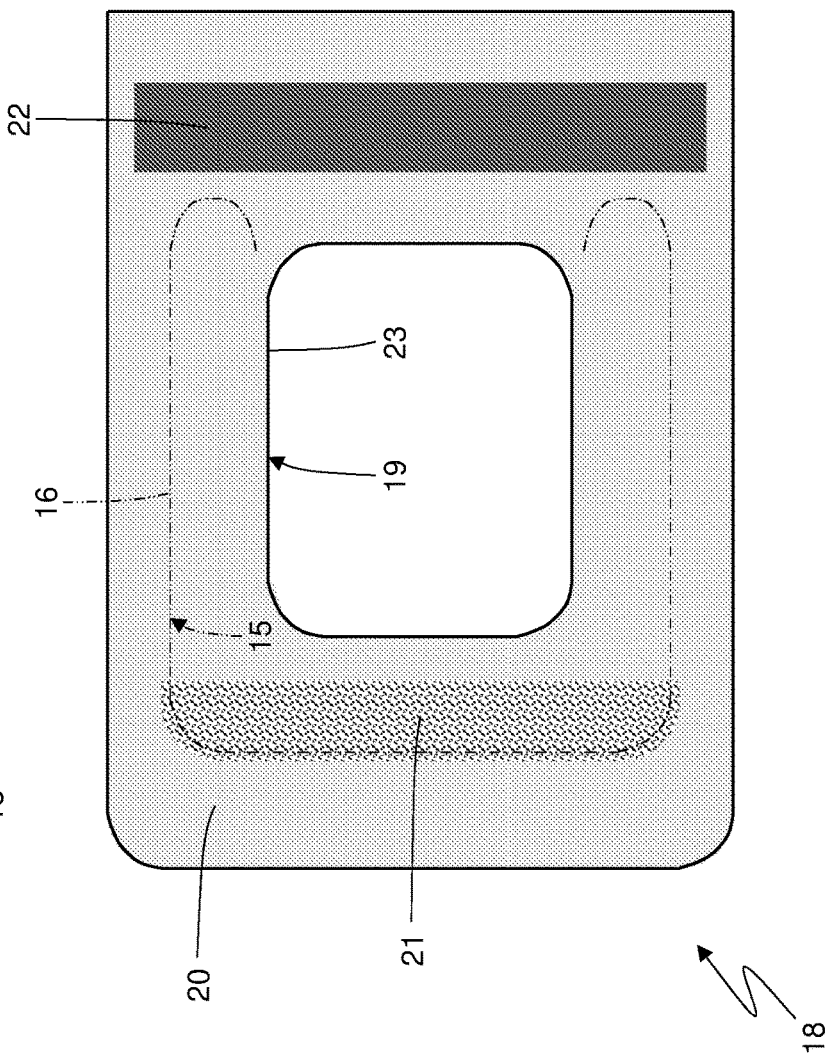
Fig.10
Fig.9

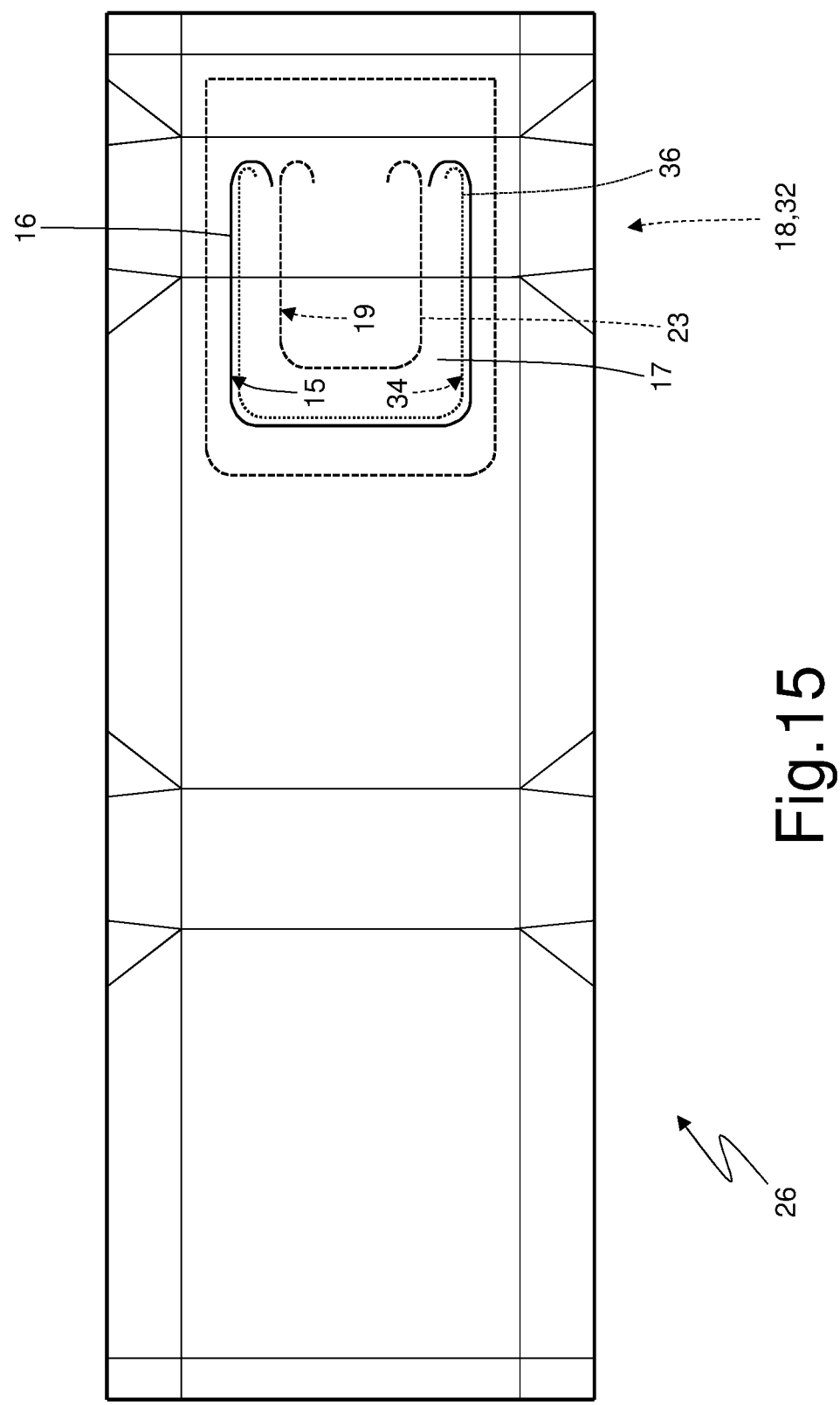

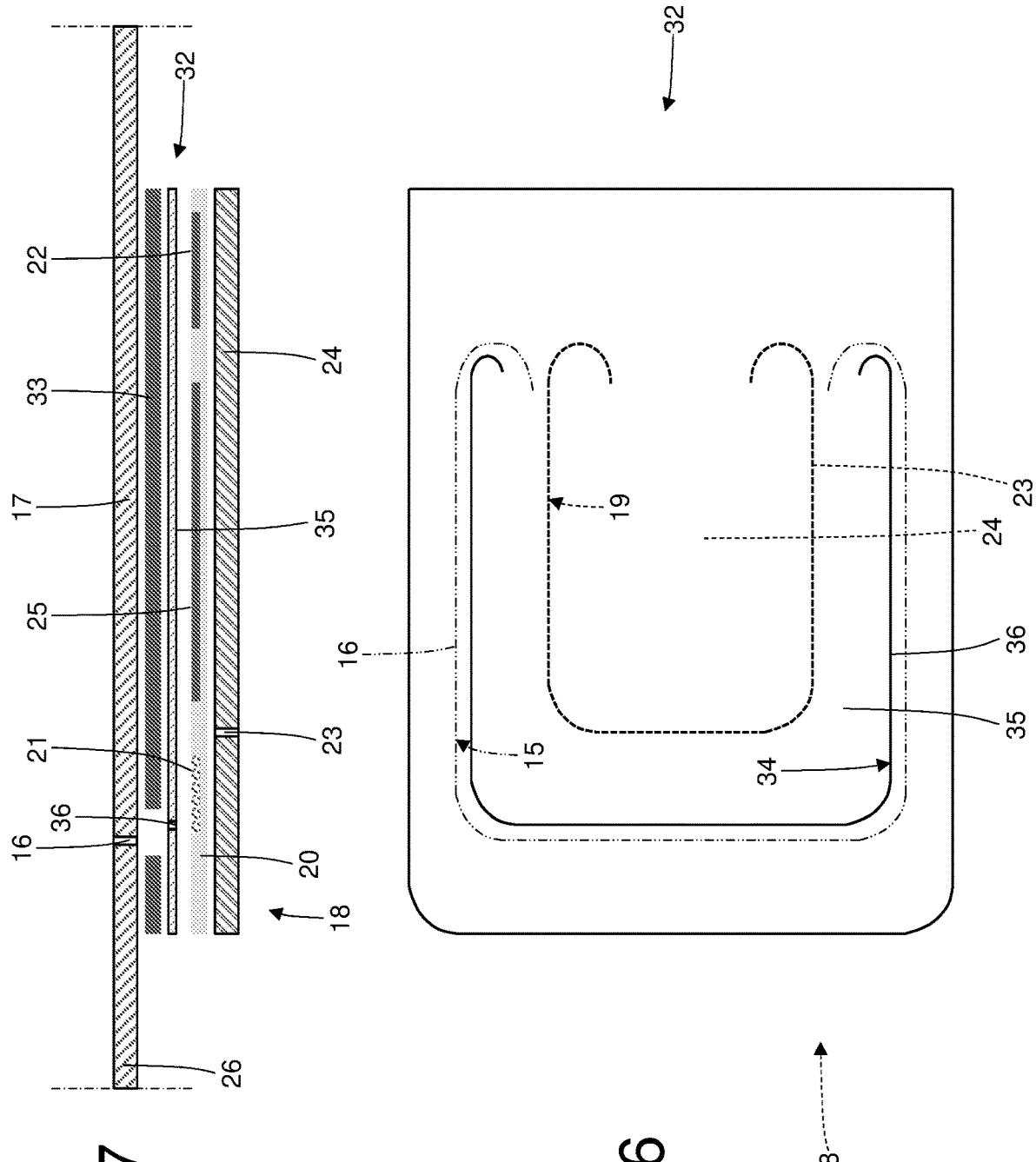

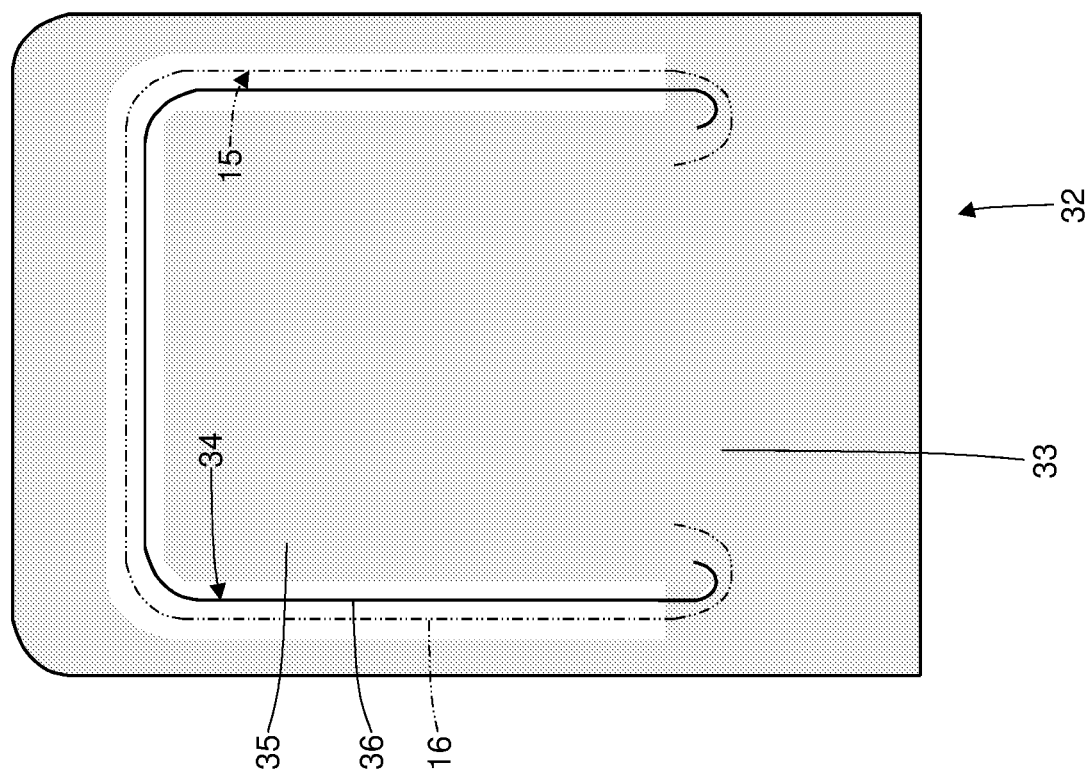

WRAP FOR SMOKING ARTICLES WITH A REUSABLE CLOSING PORTION

CROSS-REFERENCE TO RELATED APPLICATIONS

This Patent Application is a U.S. national phase of International Patent Application No. PCT/IB2020/056221 filed Jul. 1, 2020, which claims the benefit of priority from Italian Patent Applications No. 102019000010518 filed on Jul. 1, 2019, the respective disclosures of which are each incorporated herein by reference in their entireties.

FIELD OF THE ART

The present invention relates to a wrap for smoking articles with a reusable closing portion.

The present invention finds advantageous application in a rigid packet of cigarettes with a hinged cover, provided with a sealed wrap with a resealable portion, to which the following description will make explicit reference without thereby losing in generality.

PRIOR ART

Rigid packets of cigarettes with a hinged cover are the most popular packets of cigarettes currently available on the market as they are simple to produce, easy and practical to use, and offer good protection for the cigarettes contained therein.

A rigid packet of cigarettes with a hinged cover comprises an inner wrap consisting of a group of cigarettes wrapped in a sheet of metallic paper and a rigid outer casing, which accommodates the inner wrap; initially, the inner wrap is completely closed and has an extraction opening for the cigarettes, which can be closed by a disposable removable tear part (referred to as the "pull") which is removed when the packet of cigarettes is opened for the first time, to allow the extraction of the cigarettes enclosed by the inner wrap or it can be closed by a reusable closing portion (i.e. of the "open & close" type), which is connected to the inner wrap by means of a re-stick glue. The outer casing consists of a cup-shaped container having an open upper end, and a cover, which is also cup-shaped and hinged to the container to rotate, with respect to the container, between an opening position and a closing position of the open end. A sheet of overwrap made of a transparent plastic material (normally cellophane or polypropylene) is wrapped around the outer wrap and sealed by means of heat-sealing to preserve the humidity and aroma of the tobacco. In known rigid packets of cigarettes, the inner wrap provided with a reusable closing portion is always made by cutting, with a through cut, the sheet of wrap forming the inner wrap, to define the extraction opening and applying, to the outer surface of the sheet of wrap, the closing portion, which has a re-stick glue on the inner face facing the sheet of wrap. The re-stick glue on the inner face of the closing portion determines a permanent gluing of the part of the sheet of wrap enclosed by the through cut to the closing portion and a separable gluing, in use, of the part of the sheet of wrap arranged around the through cut, to the closing portion; consequently, on lifting the closing portion (i.e. by detaching the closing portion from the sheet of wrap) the closing portion takes with it the part of the sheet of wrap enclosed by the through cut, thus freeing the extraction opening.

However, this kind of solution means that the width of the closing portion is significantly smaller than the width of the inner wrap, to prevent the closing portion from accidentally protruding from the side edge of the inner wrap due to the effect (inevitable) of the application tolerance, causing: an undesired aesthetic appearance, a potential process problem since the edge of the closing portion protruding from the side edge of the inner wrap can trip and cause the process to stop (i.e. dragging) or it can be damaged, and a possible functional problem since the protruding part can become pinched/locked between the outer casing and the inner wrap, consequently making it impossible to lift and re-seal the closing portion correctly.

Furthermore, making the closing portion significantly tighter than the inner wrap results in a consequent reduction of the width of the extraction opening (the extraction opening must always be opportunely tighter than the closing portion) and, consequently, greater difficulty in extracting the cigarettes through the extraction opening.

Patent application EP2345600A2 describes a packet of cigarettes having a sealed casing, which encloses a group of cigarettes, an extraction opening sealed by a resealable closing panel and is made by folding, around the group of cigarettes, a sheet of multi-layer wrap material having at least one outer layer and one inner layer overlapping each other; in particular, the inner layer of the sheet of multi-layer wrap material has a first U-shaped cut defining the extraction opening and the outer layer of the sheet of multi-layer wrap material has a second U-shaped cut, which is bigger than the first cut and surrounds the first cut on three sides, defining the edges of the closing panel.

Patent application WO2017093831A1 describes a packet of cigarettes having a sealed casing, enclosing a group of cigarettes, which has an extraction opening closed by a resealable closing panel and is made by folding, around the group of cigarettes, a sheet of multi-layer wrap material, having at least one outer layer and one inner layer, overlapping each other.

DESCRIPTION OF THE INVENTION

It is an object of the present invention to provide a wrap for smoking articles with a reusable closing portion, which sealed wrap is devoid of the drawbacks described above and is cheap and easy to produce at the same time.

According to the present invention a wrap for smoking articles is provided with a reusable closing portion, according to what is claimed in the attached claims.

The claims describe preferred embodiments of the present invention, forming an integral part of the present description.

BRIEF DESCRIPTION OF THE DRAWINGS

The present invention will now be described with reference to the attached drawings, depicting non-limiting embodiments thereof, wherein:

FIG. 5 is a front view of the wrap in FIG. 4 in an open configuration;

FIG. 9 is a plan view of a support element, which is coupled to the sheet of wrap in FIG. 8;

FIG. 10 is a schematic and longitudinal sectional view of a part of the sheet of wrap in FIG. 8 coupled to the support element in FIG. 9 and at an extraction opening of the cigarettes;

FIG. 15 is a plan view of a sheet of heat-sealable wrap used for making the wrap in FIG. 14;

FIG. 16 is a plan view of an intermediate element and a support element, which are coupled to the sheet of wrap in FIG. 15;

FIG. 17 is a schematic and longitudinal sectional view of a part of the sheet of wrap in FIG. 15 coupled to the intermediate element and to the support element in FIG. 16 and at an extraction opening of the cigarettes;

FIG. 20 is a plan view of the only intermediate element in FIG. 16, with a permanent glue applied to the intermediate element highlighted.

PREFERRED EMBODIMENTS OF THE INVENTION

Figure 2:
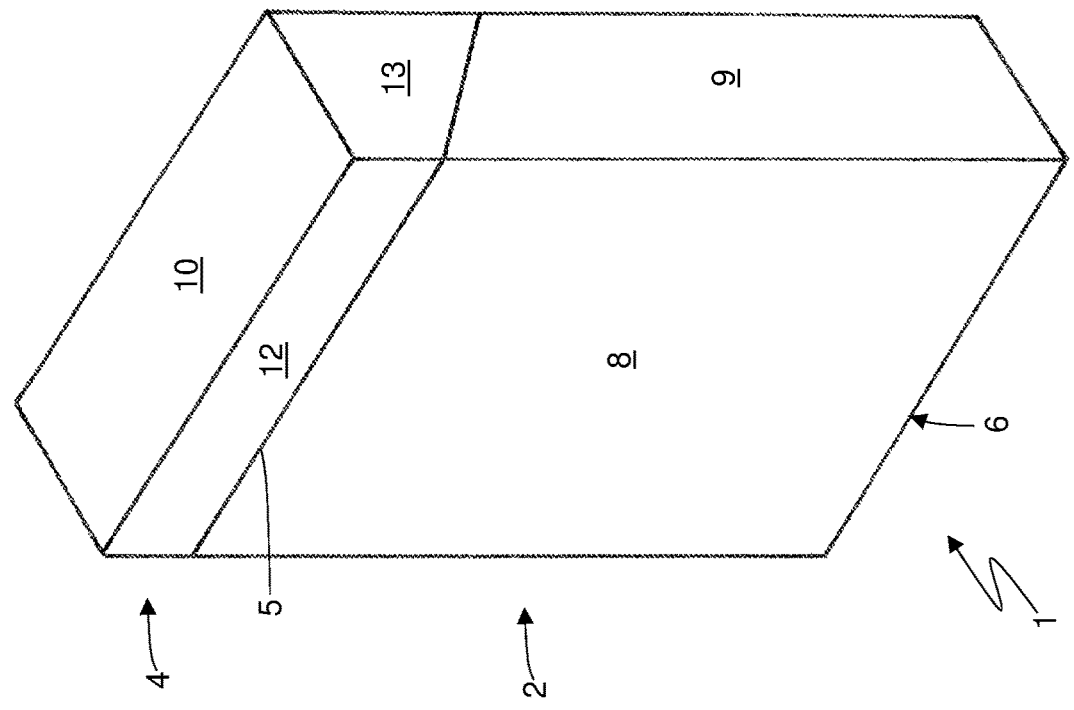
FIG. 2 is a rear perspective view of the packet of cigarettes in FIG. 1 in a closed configuration.
Figure 1:
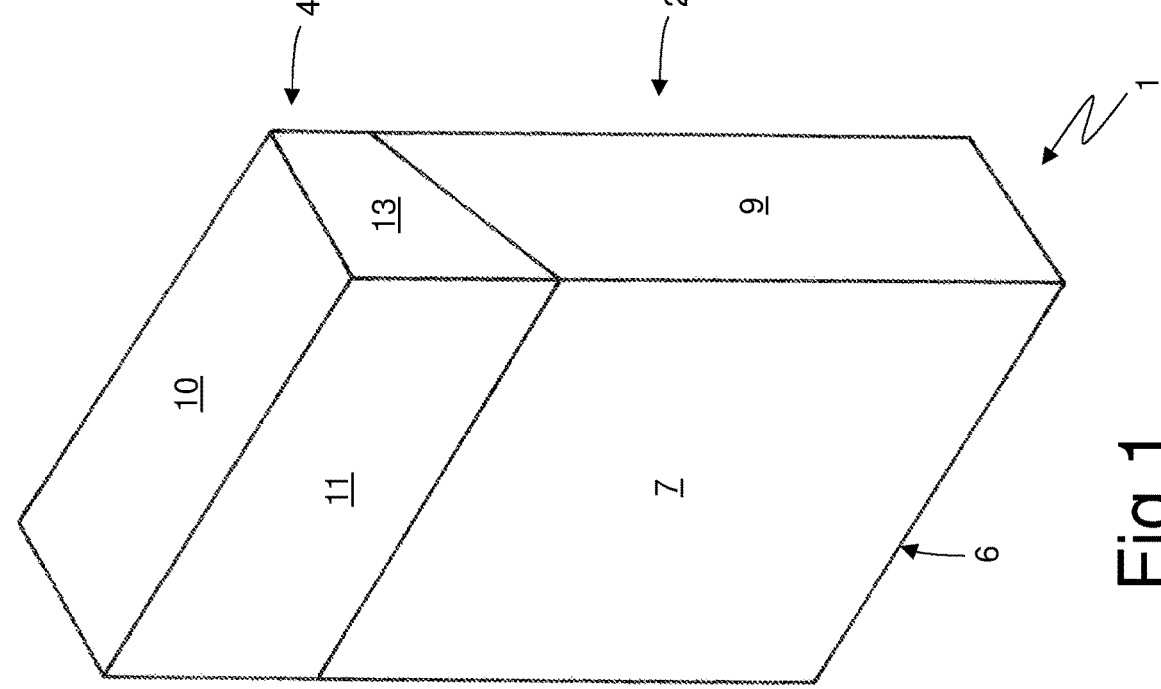
FIG. 1 is a front perspective view and a view in a closed configuration of a packet of cigarettes made according to the present invention.
Figure 3:
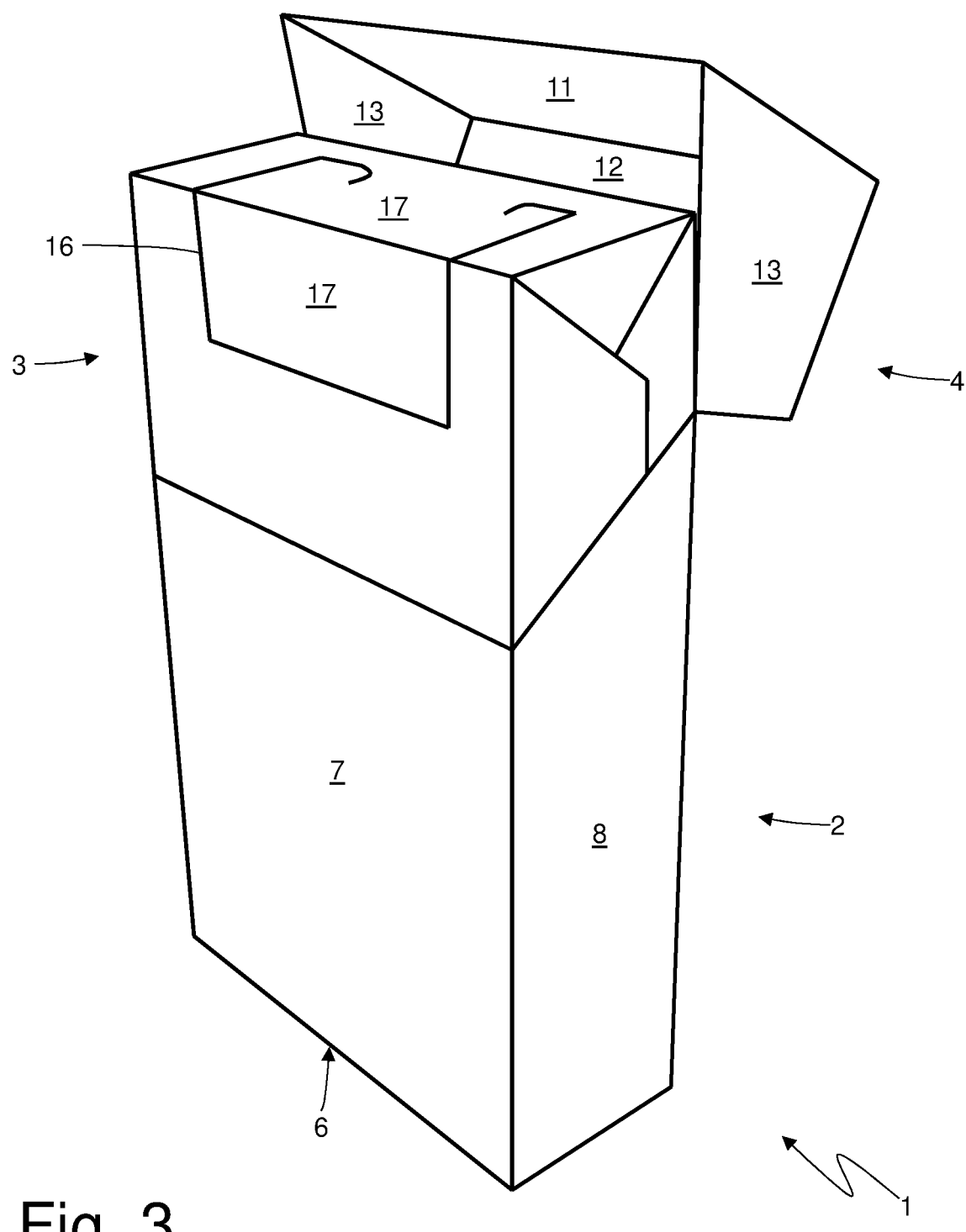
FIG. 3 is a front perspective view of the packet of cigarettes in FIG. 1 in an open configuration.

In FIGS. 1, 2 and 3 reference numeral 1 globally denotes a rigid packet of cigarettes. The packet 1 of cigarettes comprises a container 2, which is cup-shaped, has an open upper end and accommodates a sealed wrap 3 (better depicted in FIGS. 4 and 5), and a cover 4, which is cup-shaped and hinged to the container 2 along a hinge 5 (depicted in FIG. 2), to rotate, with respect to the container 2, between an opening position (depicted in FIG. 3) and a closing position (depicted in FIGS. 1 and 2) of the open upper end. The container 2 has a substantially rectangular parallelepiped shape oriented according to a prevalent vertical direction of development, it is cup-shaped and has an open upper end, a lower wall 6 opposed to the open upper end, a front wall 7 and a rear wall 8 (in which the hinge 5 is obtained), which are parallel and opposed to each other, and two side walls 9, which are parallel and opposed to each other. Four longitudinal edges are defined between the front 7, rear 8 and side 9 walls of the container 2, while four transversal edges are defined between the walls 7, 8 and 9 and the lower wall 6 of the container 2.

The cover 4 has a substantially rectangular parallelepiped shape, it is cup-shaped and has an open lower end (facing the open upper end of the container 2 when the cover 4 is in the closing position), an upper wall 10 (which is parallel and opposed to the lower wall 6 of the container 2 when the cover 4 is in the closing position), a front wall 11 (which is parallel and aligned with the front wall 7 of the container 2 when the cover 4 is in the closing position), a rear wall 12 (which is parallel and aligned with the rear wall 8 of the container 2 when the cover 4 is in the closing position and it is hinged to the rear wall 8 of the container 2 along the hinge 5), and two side walls 13 parallel and opposed to each other (which are parallel and aligned, in particular, coplanar and adjacent, to the side walls 9 of the container 2 when the cover 4 is in the closing position). Four longitudinal edges are defined between the front 11, rear 12 and side 13 walls of the container 4, while four transversal edges are defined between the walls 11, 12 and 13 and the upper wall 10 of the cover 4. The longitudinal edges and the transversal edges of the cover 4 are parallel and aligned with the corresponding longitudinal and transversal edges of the container 2 when the cover 4 is in the closing position.

Figure 6:
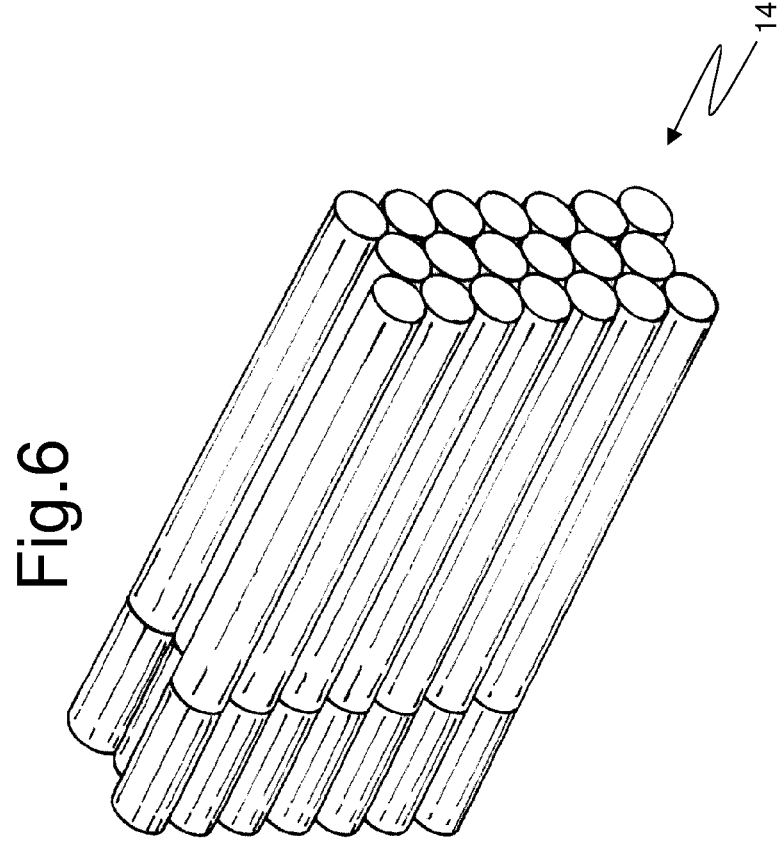
FIG. 6 is a perspective view of a group of cigarettes enclosed in the wrap in FIG. 4.

According to the embodiment depicted in the attached figures, the packet 1 of cigarettes is devoid of a collar; according to a different embodiment, not depicted, the packet 1 of cigarettes comprises a collar, which is fastened (normally by means of gluing) folded in a "U" inside the container 2, partially protruding outside the open upper end and engaging a corresponding inner surface of the cover 4 when the same cover 4 is arranged in the stated closing position; preferably, the collar is provided with closing elements (for example, a pair of laterally protruding claws), to keep the cover 4 in the closing position. The wrap 3 encloses a group 14 of cigarettes (depicted in FIG. 6), which is parallelepiped-shaped; a group 14 of standard-type cigarettes is depicted in FIG. 6 consisting of twenty cigarettes, but the number and arrangement of the cigarettes forming the group 14 of cigarettes may vary.

Figure 4:
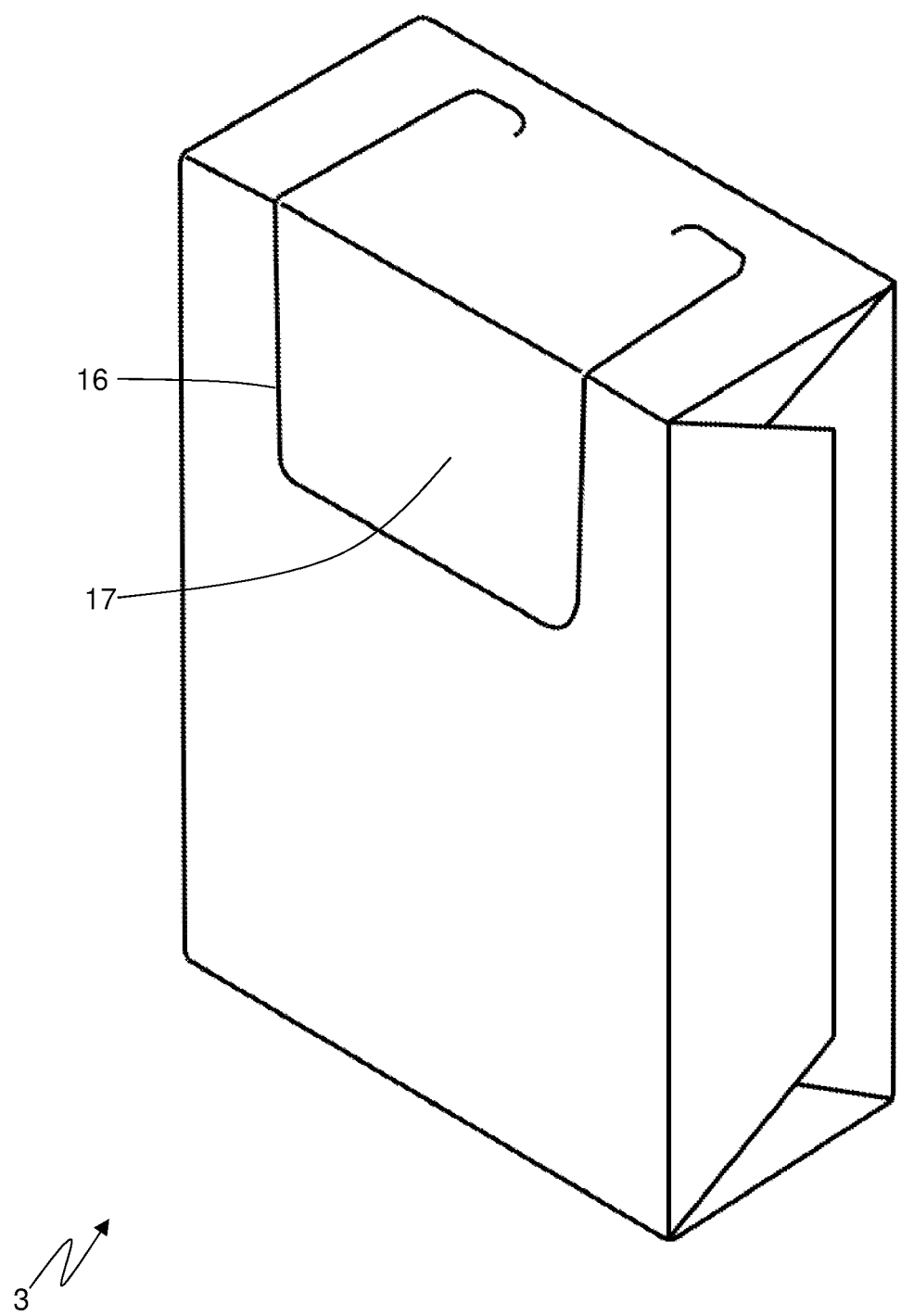
FIG. 4 is a front view of a wrap of the packet in FIG. 1 in a closed configuration.
Figure 7:
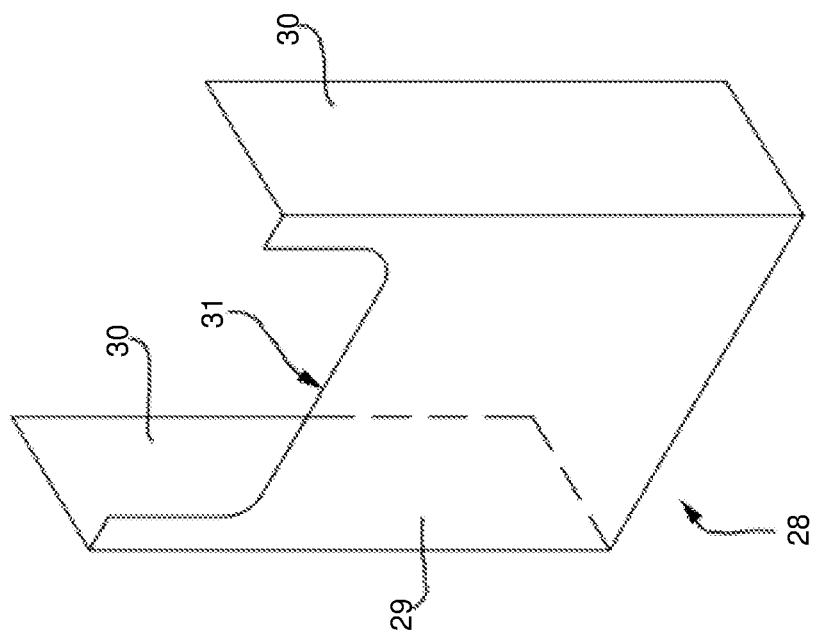
FIG. 7 is a perspective view of a reinforcement element coupled to the group of cigarettes in FIG. 6 and enclosed in the wrap in FIG. 4.

At the top and at the front, the wrap 3 has an extraction opening 15 for the cigarettes (depicted in FIG. 5), which is obtained through the wrap 3 (i.e. through the packaging material forming the wrap 3) by means of a "U"-shaped through cut 16. The extraction opening 15 is normally closed by a reusable closing portion 17 (depicted in FIGS. 3, 4 and 5), which consists of the part of the wrap 3 enclosed in the through cut 16 and it can be lifted (as depicted in FIG. 5), to free the extraction opening 15 and then lowered again (as depicted in FIGS. 3 and 4), to engage (close) the extraction opening 15.

The wrap 3 has a support element 18, which is arranged inside the wrap 3 (thus between the wrap 3 and the group 14 of cigarettes) in contact with an inner surface of the wrap 3; in other words, the wrap 3 has an outer surface, which is in contact with the outer container 2 and with the cover 4 and it is directly visible by the user when he/she opens the cover 4 and an inner surface, which is opposed to the outer surface and in contact with the support element 18 and with the group 14 of cigarettes (outside the support element 18).

The support element 18 is arranged at the extraction opening 15 of the wrap 3 (i.e. it closes, at least partially from the inside, the extraction opening 15) and has an extraction opening 19 thereof, which is smaller than the extraction opening 15 of the wrap 3, it is centred inside the extraction opening 15 of the wrap 3, and is entirely contained in the extraction opening 15 of the wrap 3. Consequently, the cigarettes can be extracted from the wrap 3 passing through the extraction opening 19 of the support element 18 (smaller and further inward) and through the extraction opening 15 of the wrap 3 (larger and further outward).

In other words, the support element 18 is in direct contact with the group 14 of cigarettes without the interposition of other elements (i.e. the support element 18 touches the group of cigarettes), it extends only at a front wall and an upper wall of the wrap 3, and has a smaller extraction opening 19 than the extraction opening 15 and it is entirely contained in the extraction opening 15.

According to the illustration in FIGS. 9 and 10, a re-stick glue 20 is interposed between the wrap 3 and the support element 18 (which doesn't dry after the application thereof and consequently allows the separation and successive re-sticking to be repeated several times), which determines the permanent gluing (i.e. which, even in use, is never separated) between the part of the wrap 3 outside the closing portion 17 (i.e. the part of the wrap 3, which doesn't belong to the closing portion 17 and is outside the extraction opening 15) and the support element 18. Furthermore, the re-stick glue 20 arranged between the wrap 3 and the support element 18 determines the separable gluing (i.e. which is separated in use and consequently reset several times) between the closing portion 17 and the support element 18 (clearly only around the extraction opening 19 of the support element 18, i.e. in the "U"-shaped strip, which is delimited externally by the extraction opening 15 of the wrap 3 and internally by the extraction opening 19 of the support element 18).

In other words, due to the re-stick glue 20, the support element 18 is permanently glued to the wrap 3 because, due to the re-stick glue 20, the part of the wrap 3 outside the closing portion 17 is permanently glued to the support element 18; furthermore, due to the re-stick glue 20, the closing portion 17 is separably glued to the support element 18, i.e. it can stick to the support element 18 (as depicted in FIGS. 3 and 4) and it can move away from the support element 18 (as depicted in FIG. 5) and in particular, the closing portion 17 can stick to the "U"-shaped part of the support element 18, which is delimited externally by the extraction opening 15 of the wrap 3 and internally by the extraction opening 19 of the support element 18.

At a lifting edge of the closing portion 17 arranged in the front wall of the wrap 3, the re-stick glue 20 is absent or neutralized by means of a paint 21 (in any case the re-stick glue 20 doesn't act) so that the lifting edge of the closing portion 17 never sticks to the support element 18 and consequently can easily be separated from the support element 18; preferably, the paint 21 extends slightly past the through cut 16 to prevent the lifting edge of the closing portion 17 from sticking to the support element 18 due to the effect of the tolerances in some points. The lifting edge of the closing portion 17 could be separated from the remaining part of the closing portion 17 by means of a pre-weakened folding line, which favours (simplifies) the gripping of the lifting edge; alternatively, a heat-shrink paint could be used, which is applied (printed) onto the outside of the wrap 3 at the lifting edge of the closing portion 17 and it is successively heated to determine a separation of the lifting edge of the closing portion 17 lifting from the remaining part of the closing portion 17. In the embodiment depicted in the attached figures, the lifting part of the closing portion 17 is free and it is grasped by a user's fingers after the user has opened the cover 4; according to a different embodiment, which is not depicted, the lifting part of the closing portion 17 is glued to an inner surface of the front wall 11 of the cover 4 and moved by the rotation of the cover 4 (i.e. the packet 1 of cigarettes is of the "self-opening" type).

According to one possible embodiment, along (around) the through cut 16 (i.e. in a strip 1-3 mm wide and centred on the through cut 16, following the entire extension of the through cut 16), the re-stick glue 20 could be absent or neutralized by means of the application of a paint (similar to the paint 21).

According to one possible embodiment depicted in FIGS. 9 and 10, a permanent glue 22 is also interposed between the wrap 3 and the support element 18, which determines the permanent gluing (i.e. which, even in use, is never separated); the permanent glue 22 doesn't allow the support element 18 to separate from the wrap 3 other than due to the effect of a permanent breakage, i.e. after the application of the permanent glue 22, it forms a bond, which cannot be separated, other than by means of a violent or destructive tear. The permanent glue 22 is not strictly necessary and is added to the action of the re-stick glue 20, making the connection between the wrap 3 and the support element 18 stronger and more stable. Clearly, the permanent glue 22 can only be present in the areas in which the wrap 3 must never detach from the support element 18, i.e. the permanent glue 22 can only be present outside the closing portion 17. In other words, the permanent glue 22 is arranged by the re-stick glue 20 (in addition to the re-stick glue 20) to increase the bond with respect to the presence of only the re-stick glue 20.

In the embodiment depicted in FIGS. 5 and 8-10, the support element 18 has a through hole (i.e. an actual "hole"), which defines the extraction opening 19 thereof; in other words, a through hole is made in the support element 18 with the removal of material defining the extraction opening 19. The through hole, defining the extraction opening 19 of the support element 18 comprises cutting the central part of the support element 18 along a through cut 23, which is closed in a ring shape; the part of the support element 18 inside the through cut 23 separates from the rest of the support element 18 and is eliminated (discarded) and such operation is generally carried out by the paper mill, which produces the support elements 18 (i.e. the support elements 18 reach the packaging machine already devoid of the central part enclosed by the through cut 23, which is closed in a ring shape). Consequently, the closing portion 17, at the extraction opening 19 of the support element 18, is in direct contact with the cigarettes of the group 14 of cigarettes, i.e. the inner surface of the closing portion 17 can touch the cigarettes of the group 14 of cigarettes.

Figure 13:
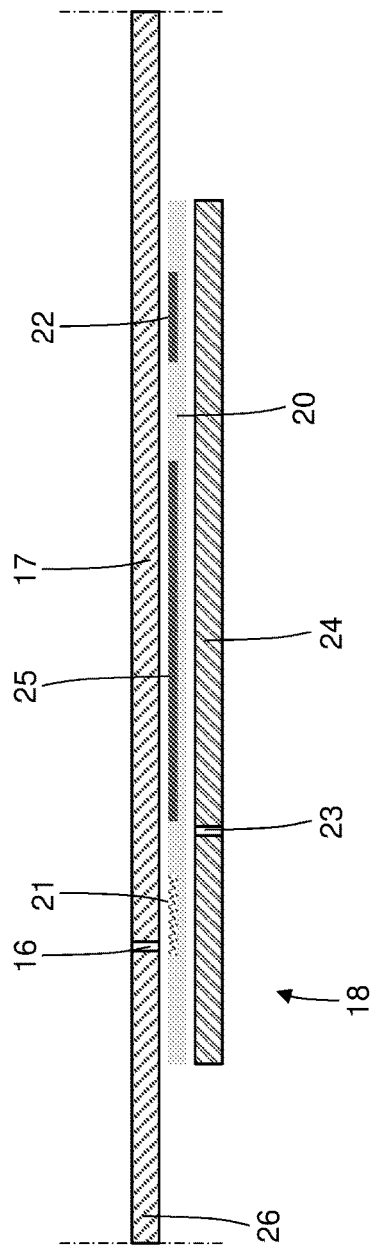
FIG. 13 is a schematic and longitudinal sectional view of a part of the sheet of wrap in FIG. 8 coupled to the support element in FIG. 12 and at an extraction opening of the cigarettes.
Figure 12:
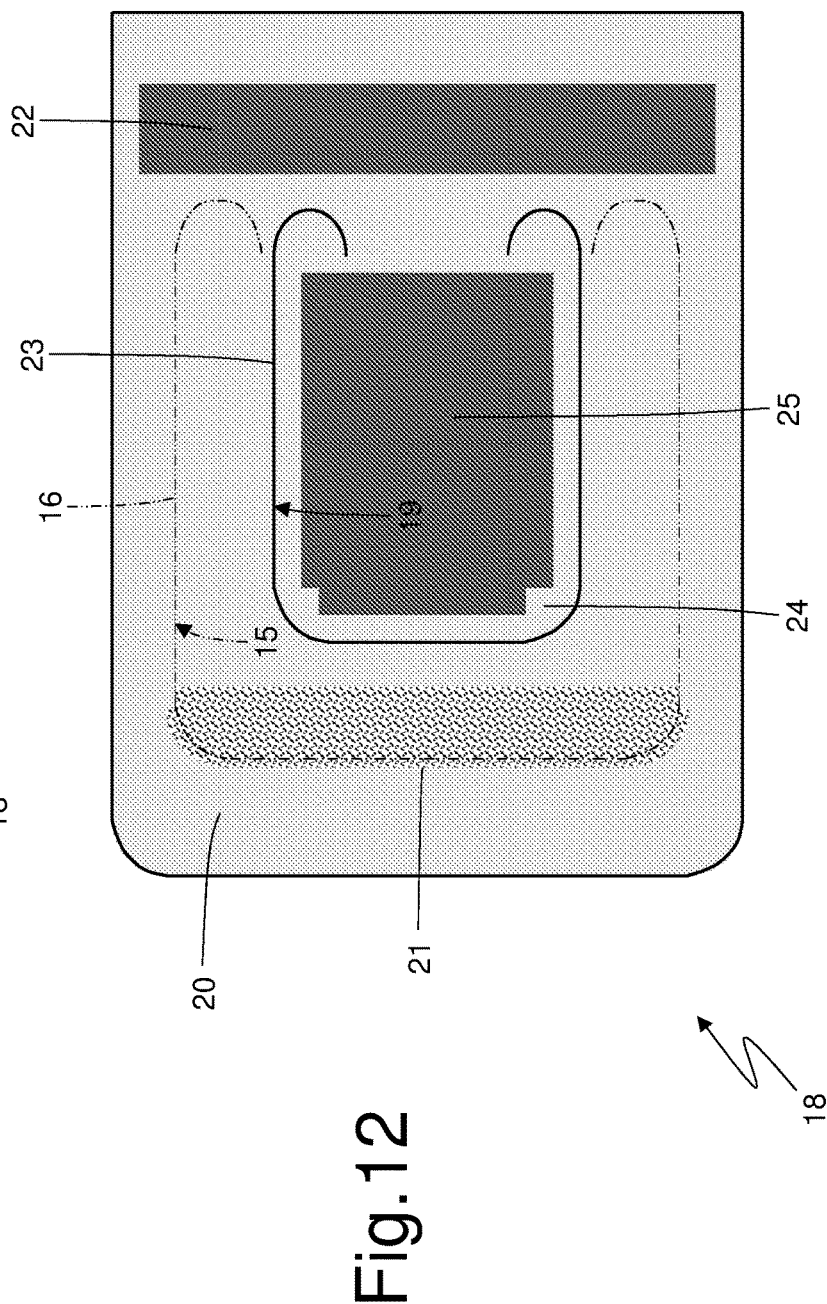
FIG. 12 is a plan view of a variation of the support element in FIG. 9.
Figure 14:
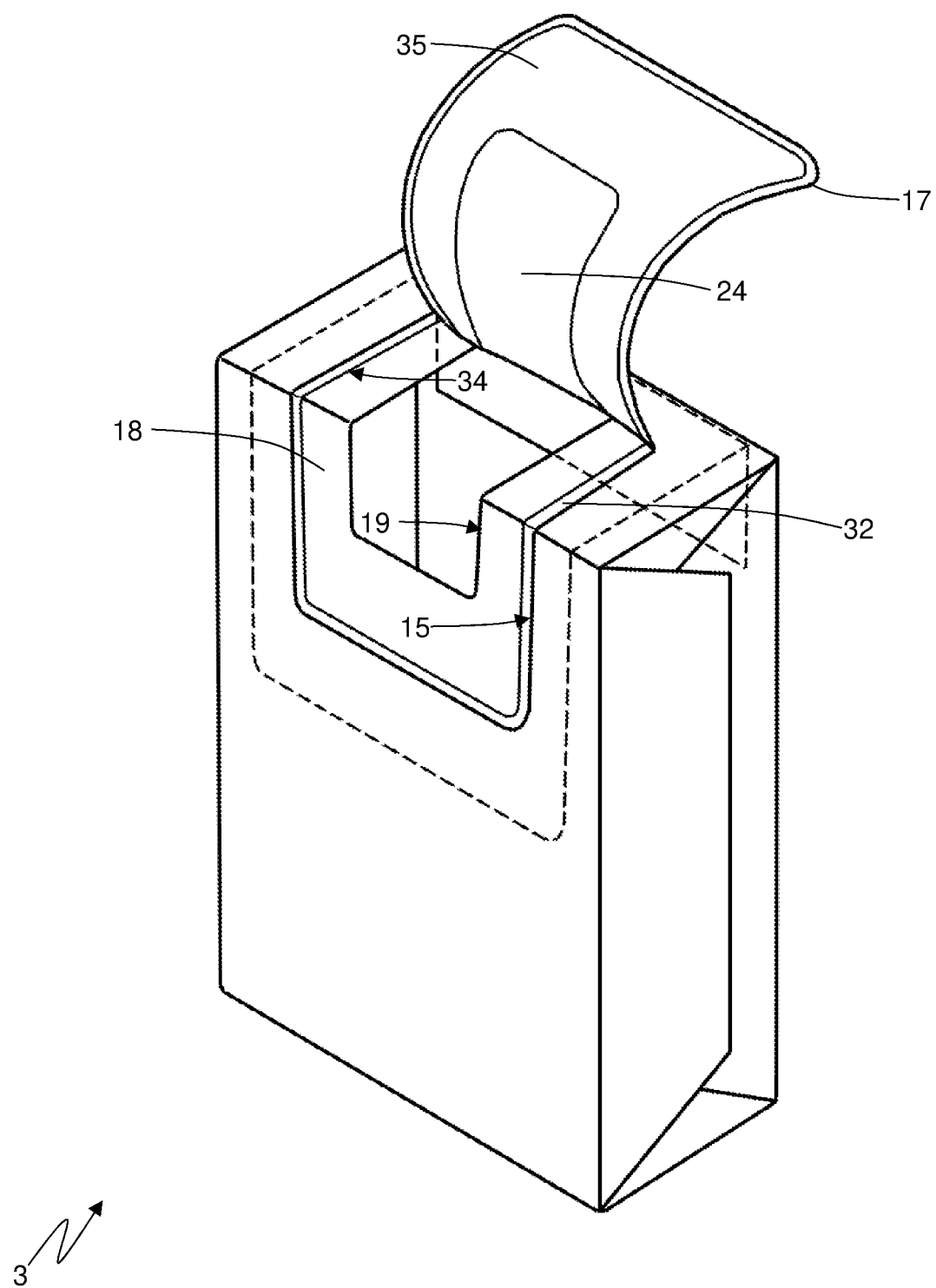
FIG. 14 is a front view of a variation of the wrap in FIG. 4 in an open configuration.
Figure 19:
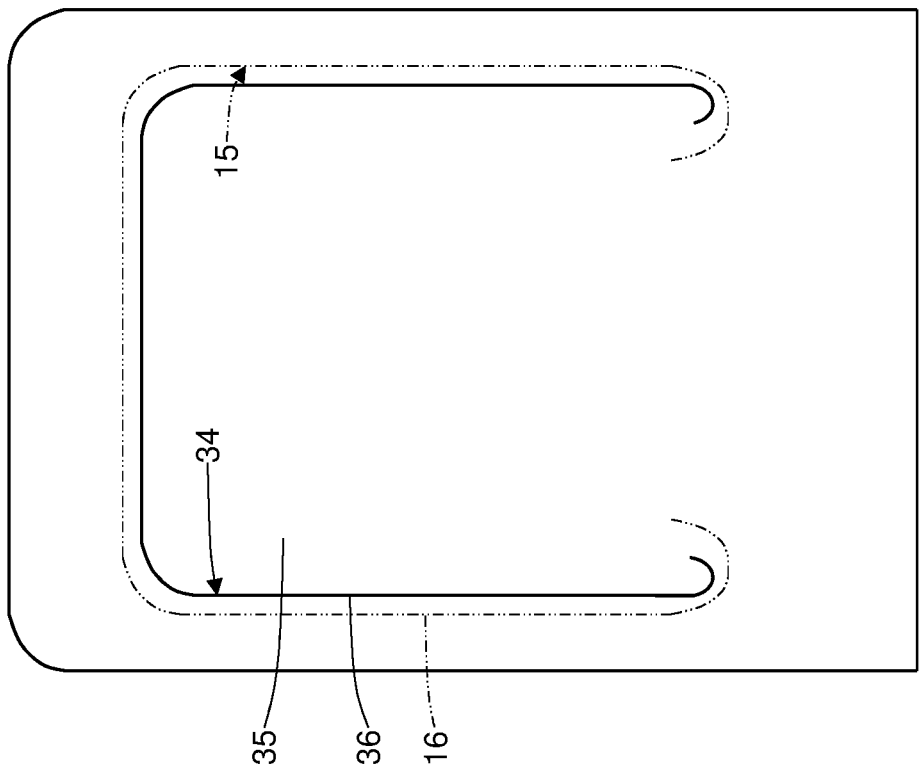
FIG. 19 is a plan view of the only intermediate element in FIG. 16.
Figure 18:
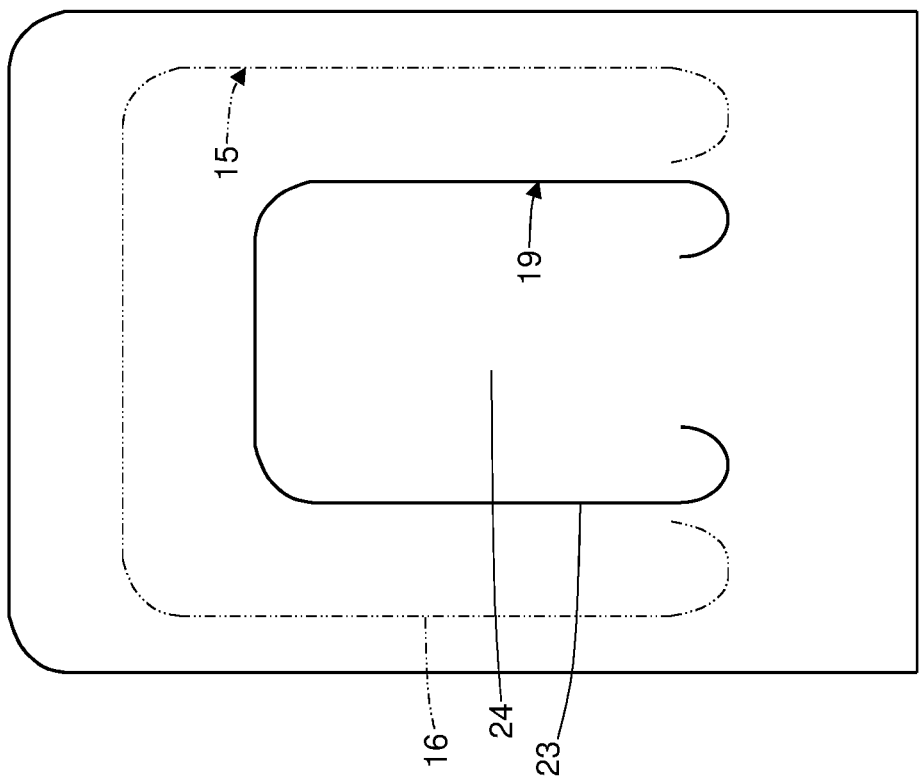
FIG. 18 is a plan view of the only support element in FIG. 16.

In the embodiment depicted in FIGS. 12 and 13, the support element 18 has a movable part 24, which is arranged at the closing portion 17 and it is permanently glued to the closing portion 17 (i.e. it never detaches from the closing portion 17). The movable part 24 of the support element 18 is delimited from the remaining part of the support element 18 by the through cut 23, which is "U"-shaped in this embodiment. The movable part 24 of the support element 18 is permanently glued to the closing portion 17 typically both due to the effect of the re-stick glue 20, and due to the effect of an additional permanent glue 25; the permanent glue 25 (which might also not be present) determines a strong mechanical bond and doesn't allow the movable part 24 to separate from the wrap 3 other than due to the effect of a permanent breakage. According to one possible embodiment, along (around) the through cut 23 (i.e. in a strip 1-3 mm wide and centred on the through cut 23, following the entire extension of the through cut 23), the re-stick glue 20 could be absent or neutralized by means of the application of a paint (similar to the paint 21).

Figure 8:
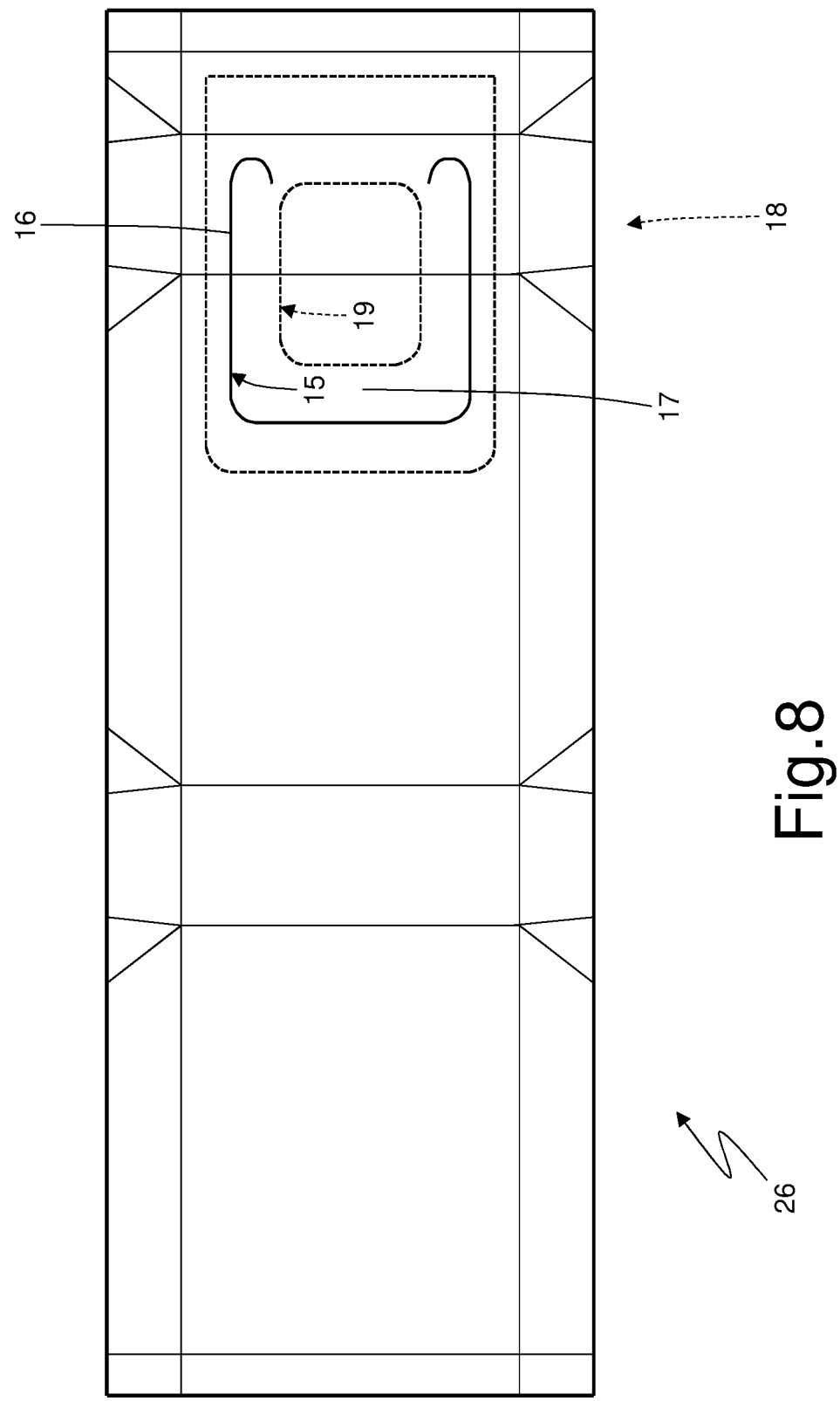
FIG. 8 is a plan view of a sheet of heat-sealable wrap used for making the wrap in FIG. 4.

According to the illustration in FIG. 8, the wrap 3 is obtained by folding a wrapping sheet 26 of heat-sealable wrap, which has a rectangular shape, is folded around the group 14 of cigarettes and, once folded, it is stabilized by means of heat sealing (i.e. parts overlapping the sheet 24 of wrap are stably connected to one another by means of heat sealing). The sheet 24 of wrap has the through cut 16 (it is crossed by the through cut 16), which is "U"-shaped and defines the extraction opening 15 of the wrap 3. Furthermore, the support element 18, which completely covers the extraction opening 15, is glued (on the inner side) to the wrapping sheet 26; the re-stick glue 20, interposed between the support element 18 and the wrapping sheet 26, is sensitive to pressure (i.e. it doesn't dry), which also allows the closing portion 17 to be separated from the support element 18, even after a long period and for an elevated number of times, and the closing portion 17 to be re-joined to the support element 18. Preferably, the through cut 16, which defines the extraction opening 15, is made on the wrapping sheet 26 before coupling (gluing) the support element 18 to the wrapping sheet 26. Consequently, the support element 18 is glued (by means of the re-stick glue 20) to the sheet 24 of wrap when the sheet 24 of wrap is still flat and before starting to fold the sheet 24 of wrap around the group 14 of cigarettes.

In other words, the support element 18 is in direct contact with the group 14 of cigarettes without the interposition of other elements (i.e. the support element 18 touches the group of cigarettes), it is smaller than the wrapping sheet 26, extending only at the front wall and the upper wall of the wrap 3, it is glued to the wrapping sheet 26 by means of the re-stick glue 20, and it has a smaller extraction opening 19 than the extraction opening 15 and it is entirely contained in the extraction opening 15. In particular, in the embodiment depicted in FIGS. 5-10, the support element 18 is smaller than the wrapping sheet 26 and arranged only in contact with the front wall and the upper wall of the wrap 3.

Figure 11:
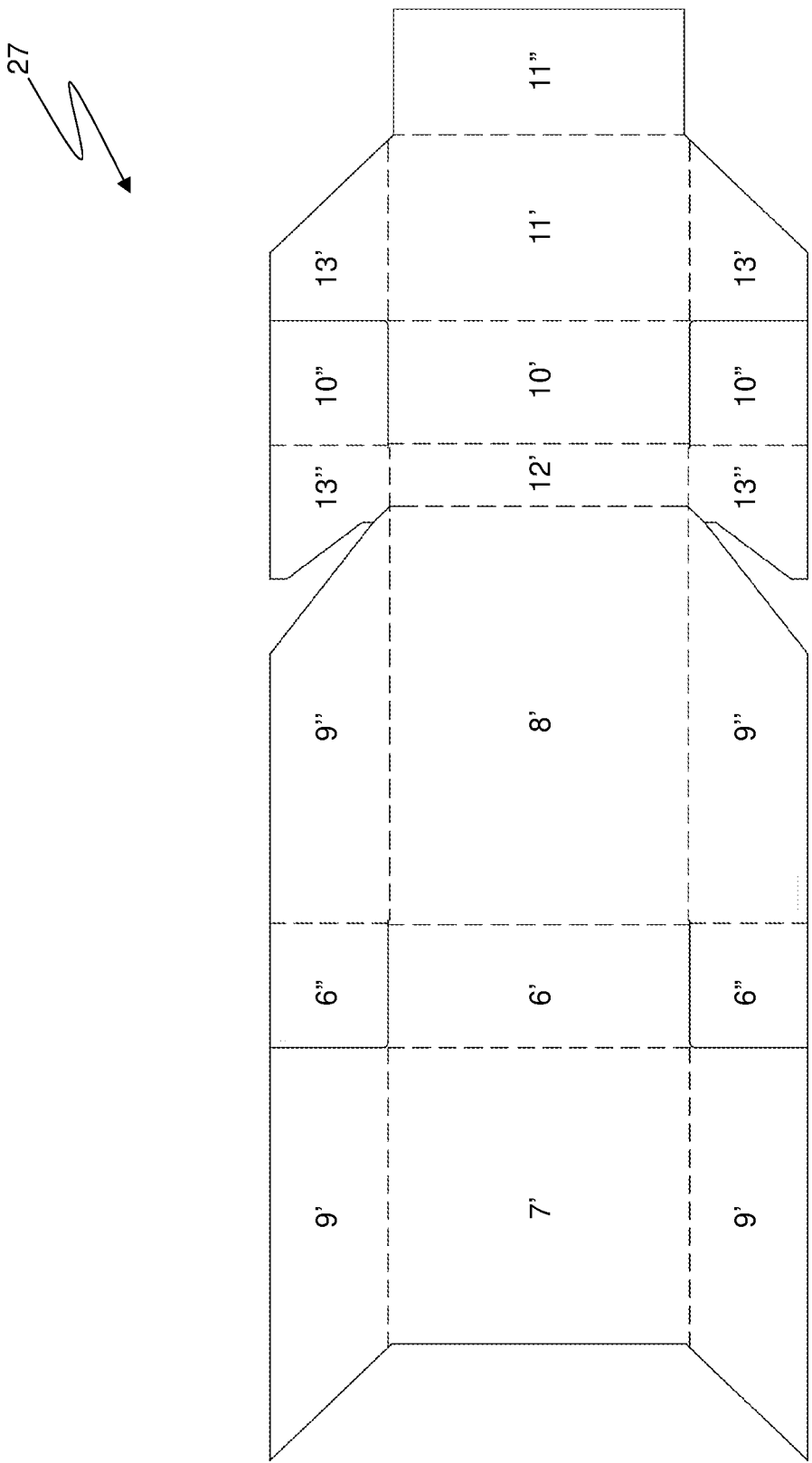
FIG. 11 is a plan view of a draft used to make the outer container and the hinged cover in FIGS. 1, 2 and 3.

According to the illustration in FIG. 11, the container 2 and the cover 4 are made by folding a flat draft 27 consisting of cardboard or rigid paper board and having a substantially elongated rectangular shape; the parts of the draft 27 are indicated with accented reference numerals equal to the reference numerals marking the corresponding walls of the container 2 and of the cover 4. The draft 27 has a reinforcement slide 11", which is connected to the front wall 11 of the cover 4 along a transversal folding line, it is bent by 180° (in the packet 1 of cigarettes) with respect to the front wall 11 of the cover 4 (i.e. with respect to the panel 11'), and it is supported and glued against an inner surface of the front wall 11 of the cover 4 (i.e. against the panel 11').

According to one possible embodiment, the wrap 3 is devoid of a reinforcement element made of cardboard or rigid paperboard and it is arranged inside the wrap 3 in contact with the group 14 of cigarettes. According to a different embodiment depicted in FIG. 7, the wrap 3 comprises a reinforcement element 28, which consists of cardboard or rigid paperboard (similar to the cardboard or rigid paperboard forming the container 2), it is "U"-shaped and arranged inside the wrap 3, in contact with the group 14 of cigarettes. In the embodiment depicted in FIG. 7, the reinforcement element 28 comprises a rectangular-shaped front wall 29, which is arranged in contact with a front wall of the group 14 of cigarettes and a pair of side wall s 30, which are connected to the sides opposed to the front wall 29 and they are arranged in contact with the side walls of the group 14 of cigarettes; the front wall 29 has a window, which is arranged at the top, it is delimited by an edge 31, it is "U"-shaped, and facilitates the removal of the cigarettes from the group 14 of cigarettes as it leaves an upper area of the front wall of the group 14 of cigarettes exposed.

In the embodiment depicted in the attached figures, the support element 18 is completely separate and independent from the reinforcement element 28 and if necessary, it can touch the reinforcement element 28 in some limited areas (for example, at the front wall 29 of the reinforcement element 28); in this embodiment, the support element 18 is made of a single-layer or multi-layer plastic material (for example, PET or PP) having a thickness, for example, of 50-150 microns and the reinforcement element 28 is made of cardboard of paperboard having a thickness, for example, of 100-250 microns. According to another embodiment, which is not depicted, the support element 18 is integrated into the reinforcement element 28 (i.e. the reinforcement element 28 is integrated into the support element 18) and so the support element 18 and the reinforcement element 28 form a single indivisible unit and they are formed by the same material; in this embodiment, the support element 18 and the reinforcement element 28, integrated together, are made of cardboard or paper board having a thickness, for example, of 100-250 microns and, if necessary, coated with an outer layer of a plastic material.

In the embodiment depicted in FIGS. 5-10, the support element 18 (which is separate and independent from the reinforcement element 28) is directly glued (by means of the re-stick glue 20 and, if necessary, by means of the permanent glue 22) to the inner surface of the wrap 3 (i.e. of the wrapping sheet 26). In the alternative embodiment depicted in FIGS. 14-19, the support element 18 (which is separate and independent from the reinforcement element 28) is glued (by means of the re-stick glue 20 and, if necessary, by means of the permanent glue 22) to the inner surface of the wrap 3 (i.e. of the wrapping sheet 26) by means of the interposition of an intermediate element 32, which is stably and permanently connected to the wrap 3 (i.e. to the wrapping sheet 26) by means of a permanent glue 33 which forms a bond, which cannot be separated, other than by a violent and destructive tear.

The intermediate element 32 is substantially an integral part (a reinforcement) of the wrap 3 (i.e. of the wrapping sheet 26). In other words, the intermediate element 32 is stably and permanently connected to the wrap 3 (i.e. to the wrapping sheet 26) by means of the permanent glue 33, while the support element 18 is connected to the wrap 3 (i.e. to the wrapping sheet 26) with the interposition of the intermediate element 32 by means of the re-stick glue 20 and, if necessary, by means of the permanent glue 22, i.e. the support element 18 is glued (directly) to the intermediate element 32 by means of the re-stick glue 20 and, if necessary, by means of the permanent glue 22 and therefore, it is indirectly glued to the wrap 3 (i.e. to the wrapping sheet 26) due to the effect of the interposition of the intermediate element 32. According to a preferred embodiment, the re-stick glue 20 is integral with the intermediate element 32 (i.e. it is applied to the intermediate element 32) to prevent an adhesive frame all around the opening profile, which remains in contact with the group 14 of cigarettes; in this way, the re-stick glue 20 (i.e. the adhesive part) remains on the edge, which is lifted, preventing the risk of touching an adhesive strip when taking a cigarette from the group 14 of cigarettes. In the embodiment depicted in FIGS. 14-19, the movable part 24 of the support element 18 is separated from the remaining part of the support element 18 by the "U"-shaped through cut 23 and it is stably and permanently connected to the closing portion 17 (again by means of the interposition of the intermediate element 32), by means of the re-stick glue 20 and by means of the permanent glue 24 (if present). According to a different embodiment, which is not depicted, the support element 18 could be devoid of the movable part 24 and therefore, it could be made as in FIGS. 8, 9 and 10.

The intermediate element 32 is arranged at the extraction opening 15 of the wrap 3 (i.e. it closes, at least partially from the inside, the extraction opening 15) and the extraction opening 34 thereof is smaller than the extraction opening 15 of the wrap 3 and larger than the extraction opening 19 of the support element 18, it is centred inside the extraction opening 15 of the wrap 3, and around the extraction opening 19 of the support element 18, and it is entirely contained in the extraction opening 15 of the wrap 3 and externally surrounds the extraction opening 19 of the support element 18. The extraction opening 34 of the intermediate element 32 is (much) closer to the extraction opening 15 of the wrap 3 and (much) further from the extraction opening 19 of the support element 18, i.e. the size of the extraction opening 34 of the intermediate element 32 is (much) more similar to the size of the extraction opening 15 of the wrap 3 and (much) less similar to the size of the extraction opening 19 of the support element 18. Consequently, the cigarettes can be extracted from the wrap 3 passing through the extraction opening 19 of the support element 18 (smaller and further inward), through the extraction opening 34 of the intermediate element 32, and through the extraction opening 15 of the wrap 3 (larger and further outward).

The intermediate element 32 has a movable part 35, which is arranged at the closing portion 17 and it is permanently glued to the closing portion 17 (i.e. it never detaches from the closing portion 17). The movable part 35 of the intermediate element 32 is delimited from the remaining part of the intermediate element 32 by a through cut 36, which is "U"-shaped in this embodiment. The movable part 35 of the intermediate element 32 is permanently glued to the closing portion 17 due to the effect of the permanent glue 33; the permanent glue 33 doesn't allow the movable part 35 to be separated from the wrap 3 other than due to the effect of a permanent breakage.

According to a preferred embodiment depicted in FIGS. 17 and 20, along (around) the through cuts 16 and 36 (i.e. in a strip 1-3 mm wide and centred on the through cuts 16 and 36, following the whole extension of the through cuts 16 and 36), the permanent glue 33 is absent or neutralized by means of the application of a paint (similar to the paint 21) to prevent the closing portion 17 and/or the movable part 35 from blocking in the closing position due to the effect of a binding action (completely undesired) of the permanent glue 33, which "overflows" due to inevitable structural tolerances. In other words, being unable to guarantee absolute precision in the through cuts 16 and 36 and in the application of the permanent glue 33, it is necessary to comprise, along the through cuts 16 and 36, a "respect strip" (visible in FIG. 17 at the through cuts 16 and 36, better visible in FIG. 20), devoid of active permanent glue 33 (because the permanent glue 33 is absent or neutralized), to prevent the active permanent glue 33 from acting in an undesired manner over the through cuts 16 and 36.

By way of example, the support element 18 could be made of a plastic material (for example PP) having a thickness of 40-70 microns (preferably 50 microns) while the intermediate element 32 could be made of a plastic material (for example PET) having a thickness of 15-25 microns (preferably 20 microns).

According to a potential embodiment, the support element 18 and/or the intermediate element 32 can be provided with pre-weakened folding lines at the zones, in which the wrapping sheet 26 is folded around the group 14 of cigarettes (i.e. at the edges of the wrap 3); in this way, the folding of the wrapping sheet 26 around the group 14 of cigarettes requires a reduced force (and therefore, subjects the group 14 of cigarettes to less mechanical stress, reducing the possibility of damage to the cigarettes). It is important to note that the pre-weakened folding lines (for example, made by means of embossing or by means of non-through cuts) ruin the aesthetics of the support element 18 and/or of the intermediate element 32, but it isn't a problem as the support element 18 and the intermediate element 32 are arranged inside the wrap 3 and so they are not visible from the outside.

From a constructional point of view, initially, the support element 18 (typically after the creation of the through cut 23, which delimits the extraction opening 19 and the movable part 24) is coupled (glued) to the intermediate element 32 (typically after the creation of the through cut 36, which delimits the extraction opening 34 and the movable part 35); so the assembly of the support element 18 and the intermediate element 32 is coupled to the wrapping sheet 26 (typically after the creation of the through cut 16, which delimits the extraction opening 15 and the closing portion 17). Generally, the assembly of the support element 18 and the intermediate element 32 is made in the paper mill, which produces the wrap materials and reaches the packing machine already ready (assembled).

In the embodiments depicted in the attached figures, the longitudinal and transversal edges are straight; alternatively, the longitudinal and/or transversal edges could be rounded or bevelled.

In the embodiments depicted in the attached figures, the packet 1 of cigarettes contains a group 14 of cigarettes; alternatively, the packet 1 of cigarettes can contain any other type of article for smoking, such as, cigars, electric or electronic cigarettes (i.e. cigarettes, which generate an aerosol without combustion) for example, cartridges and refills for electronic cigarettes, new generation cigarettes.

The embodiments described herein can be combined without thereby departing from the protective scope of the present invention.

The wrap 3 described above has numerous advantages.

Firstly, in the wrap 3, described above, any error (within the structural tolerances) in the positioning of the support element 18 (coupled or not to the intermediate element 32) with respect to the wrap 3 (i.e. with respect to the wrapping sheet 26) has no negative consequences as the support element 18 (coupled or not to the intermediate element 32) is arranged inside the wrap 3 and (with the closing portion 17 not lifted) it is completely invisible from the outside. In other words, any errors (within the structural tolerances) in the positioning of the support element 18 (coupled or not to the intermediate element 32) with respect to the wrap 3 (i.e. with respect to the wrapping sheet 26) is not visible/appreciable in the slightest before lifting the closing portion 17 and does not compromise the opening functionality of the closing portion 17.

Furthermore, the outer surface of the wrap 3 described above, is completely visible (i.e. it is in no way covered by foreign elements as the closing portion 17 is part of the wrap 3) and therefore, there is no interruption/overlapping with the graphics printed on the outer surface of the wrap 3 and/or with the embossing engraved outer surface of the wrap 3.

Finally, the production of the wrap 3, described above, does not result in any changes to known packaging machines, as the support elements 18 (coupled or not to the intermediate elements 32) are applied to a ribbon of wrap material from which the single sheets 26 of wrap are separated upstream of the packaging machine (i.e. outside the packaging machine).

The invention claimed is:

1. A wrap (3) for smoking articles, which encloses a group (14) of smoking articles, is obtained by folding a wrapping sheet (26) of rectangular-shaped wrap around the group (14) of smoking articles, once folded the wrapping sheet is stabilized by means of heat- sealing, and the wrapping sheet has, at a top and at a front, a first extraction opening (15), which is obtained through the same wrap (3) by means of a first U-shaped through cut (16) and crosses the wrapping sheet (26);

wherein the first extraction opening (15) is normally closed by a reusable closing portion (17), which consists of the part of the wrapping sheet (26) surrounded by the first through cut (16) and the part of the wrapping sheet surrounded by the first through cut can be lifted to free the first extraction opening (15) and then lowered again to engage the first extraction opening (15);

wherein the wrap (3) for smoking articles comprises a support element (18), which is arranged inside the wrap (3) at the first extraction opening (15), the support element is in direct contact with the group (14) of smoking articles without the interposition of other elements, the support element is smaller than the wrapping sheet (26), extending only at a front wall and an upper wall of the wrap (3), the support element is glued to the wrapping sheet (26) by means of a re-stick glue (20), and has a second extraction opening (19), which is smaller than the first extraction opening (15) and is entirely contained in the first extraction opening (15);

wherein the wrap (3) for smoking articles comprises an intermediate element (32), which is interposed between the wrap (3) and the support element (18), is stably and permanently connected to the wrapping sheet (26) by means of a first permanent glue (33), and is glued to the support element (18) by means of the re-stick glue (20).

2. The wrap (3) for smoking articles according to claim 1, wherein the support element (18) is arranged between the wrap (3) and the group (14) of smoking articles.

3. The wrap (3) for smoking articles according to claim 1, wherein the re-stick glue (20) determines a gluing, which, in use, is never separated between the part of the wrapping sheet (26) outside the first extraction opening (15) and the support element (18) and the re-stick glue determines a gluing, in use, separable between the closing portion (17) and the support element (18) only around the second extraction opening (19).

4. The wrap (3) for smoking articles, according to claim 1, wherein the re-stick glue (20) is absent or neutralized at a lifting part of the closing portion (17) arranged in the front wall of the wrap (3) so that the lifting part of the closing portion (17) never adheres to the support element (18).

5. The wrap (3) for smoking articles according to claim 1, wherein a second permanent glue (22) is provided, which is arranged between the wrapping sheet (26) and the support element (18) on the outside of the closing portion (17) in addition to the re-stick glue (20) to increase the bond with respect to the presence of just the re-stick glue (20).

6. The wrap (3) for smoking articles according to claim 1, wherein the support element (18) has a through hole, which defines the second extraction opening (19) and is made by cutting a central part of the support element (18) along a second through cut (23), which is closed in a ring shape.

7. The wrap (3) for smoking articles according to claim 1, wherein;

the support element (18) has a first movable part (24), which is arranged at the closing portion (17), is permanently glued to the closing portion (17), and is delimited from the remaining part of the support element (18) by a second U-shaped through cut (23).

8. The wrap (3) for smoking articles according to claim 7, wherein a third permanent glue (25) is provided, which is arranged between the first movable part (24) of the support element (18) and the closing portion (17).

9. The wrap (3) for smoking articles according to claim 1, wherein the intermediate element (32) has a third extraction opening (34), which is smaller than the first extraction opening (15) of the wrap (3) and larger than the second extraction opening (19) of the support element (18) and the intermediate element is entirely contained in the first extraction opening (15) of the wrap (3) and externally surrounds the second extraction opening (19) of the support element (18).

10. The wrap (3) for smoking articles according to claim 9, wherein the third extraction opening (34) of the intermediate element (32) is closer to the first extraction opening (15) of the wrap (3) and further from the second extraction opening (19) of the support element (18).

11. The wrap (3) for smoking articles according to claim 9, wherein the intermediate element (32) has a second movable part (35), which is arranged at the closing portion (17), is permanently glued to the closing portion (17), and is delimited from the remaining part of the intermediate element (32) by a third U-shaped through cut (36).

12. The wrap (3) for smoking articles according to claim 11, wherein the support element (18) has a first movable part (24), which is arranged at the closing portion (17), is permanently glued to the closing portion (17) with the interposition of the second movable part (35), and is delimited from the remaining part of the support element (18) by a second U-shaped through cut (23).

13. The wrap (3) for smoking articles according to claim 11, wherein along the first through cut (16) and along the third through cut (36) the first permanent glue (33) is absent or neutralized.

14. The wrap (3) for smoking articles according to claim 1, wherein the re-stick glue (20) is applied to the intermediate element (32).

15. The wrap (3) for smoking articles according to claim 1 and comprising a reinforcement element (28) consisting of cardboard or rigid paperboard, the reinforcement element is arranged inside the wrap (3) in contact with the group (14) of smoking articles and the reinforcement element is independent and separate from the support element (18).

16. The wrap (3) for smoking articles according to claim 1 and comprising a reinforcement element (28) consisting of cardboard or rigid paperboard, the reinforcement element is arranged inside the wrap (3) in contact with the group (14) of smoking articles and the reinforcement element is integrated with the support element (18).

17. The wrap (3) for smoking articles according to claim 1, wherein the support element (18) is provided with pre-weakened folding lines at edges of the wrap (3).

* * * * *